(12) United States Patent
Jones et al.

(10) Patent No.: US 8,389,074 B2
(45) Date of Patent: *Mar. 5, 2013

(54) OPTICAL FILM ASSEMBLY AND DISPLAY DEVICE

(75) Inventors: Clinton L. Jones, Somerset, WI (US);
Brant U. Kolb, Afton, MN (US); David B. Olson, Marine on St. Croix, MN (US); Emily S. Goenner, Shoreview, MN (US); Shandon D. Hart, Maplewood, MN (US); John T. Cowher, New Richmond, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,272

(22) Filed: Mar. 28, 2012

(65) Prior Publication Data

US 2012/0189784 A1 Jul. 26, 2012

Related U.S. Application Data

(60) Continuation of application No. 12/818,224, filed on Jun. 18, 2010, now Pat. No. 8,168,271, which is a division of application No. 12/481,991, filed on Jun. 10, 2009, now Pat. No. 7,763,331, which is a continuation of application No. 11/422,900, filed on (Continued)

(51) Int. Cl.
*G02B 5/30* (2006.01)
*G02F 1/1335* (2006.01)
*G02F 1/13357* (2006.01)

(52) U.S. Cl. ........... 428/1.3; 428/1.1; 428/1.31; 349/96; 349/201; 359/485.01; 359/485.02; 359/485.06

(58) Field of Classification Search ............ 428/1.1, 428/1.3, 1.31, 411; 349/96, 201; 359/485.02, 359/485.01, 485.06

See application file for complete search history.

(56) References Cited

U.S. PATENT DOCUMENTS

| | | |
|---|---|---|
| 4,487,904 A | 12/1984 | Fukuda |
| 4,542,449 A | 9/1985 | Whitehead |
| 4,568,445 A | 2/1986 | Cates |
| 4,721,377 A | 1/1988 | Fukuda |
| 4,812,032 A | 3/1989 | Fukuda |
| 4,931,523 A | 6/1990 | Watanabe |
| 4,937,172 A | 6/1990 | Gervay |
| 4,962,163 A | 10/1990 | Hefner, Jr. |
| 4,970,135 A | 11/1990 | Kushi et al. |
| 5,066,750 A | 11/1991 | Hefner, Jr. |
| 5,073,462 A | 12/1991 | Gervay |
| 5,149,776 A | 9/1992 | Kushi |
| 5,164,464 A | 11/1992 | Hefner, Jr. |
| 5,175,030 A | 12/1992 | Lu et al. |
| 5,183,597 A | 2/1993 | Lu |
| 5,183,870 A | 2/1993 | Fukushima |

(Continued)

FOREIGN PATENT DOCUMENTS

| | | |
|---|---|---|
| EP | 0 089 041 | 11/1987 |
| EP | 1 014 113 | 6/2000 |

(Continued)

OTHER PUBLICATIONS

Search Report TW App No. 094120042, Dec. 26, 2011, 1 page.

*Primary Examiner* — Shean C Wu
(74) *Attorney, Agent, or Firm* — Carolyn A. Fischer

(57) ABSTRACT

Microstructured optical films, assemblies of films including at least one microstructured optical film, and (e.g. illuminated) display devices including a single microstructured optical film or assembly.

20 Claims, 4 Drawing Sheets

Related U.S. Application Data

Jun. 8, 2006, now Pat. No. 7,622,164, which is a continuation-in-part of application No. 10/870,366, filed on Jun. 17, 2004, now abandoned, and a continuation-in-part of application No. 10/939,184, filed on Sep. 10, 2004, now Pat. No. 7,179,513, and a continuation-in-part of application No. 10/938,006, filed on Sep. 10, 2004, now Pat. No. 7,289,202, and a continuation-in-part of application No. 11/078,145, filed on Mar. 11, 2005, now Pat. No. 7,282,272.

(56) References Cited

U.S. PATENT DOCUMENTS

| | | |
|---|---|---|
| 5,247,038 A | 9/1993 | Fukushima |
| 5,354,821 A | 10/1994 | Huver |
| 5,424,339 A | 6/1995 | Zanka |
| 5,486,949 A | 1/1996 | Schrenk |
| 5,612,820 A | 3/1997 | Schrenk |
| 5,626,800 A | 5/1997 | Williams |
| 5,635,278 A | 6/1997 | Williams |
| 5,665,494 A | 9/1997 | Kawabata |
| 5,691,846 A | 11/1997 | Benson, Jr. |
| 5,714,218 A | 2/1998 | Nishio |
| 5,760,126 A | 6/1998 | Engle |
| 5,771,328 A | 6/1998 | Wortman |
| 5,783,120 A | 7/1998 | Ouderkirk |
| 5,825,543 A | 10/1998 | Ouderkirk |
| 5,828,488 A | 10/1998 | Ouderkirk |
| 5,855,983 A | 1/1999 | Williams |
| 5,882,774 A | 3/1999 | Jonza |
| 5,898,523 A | 4/1999 | Smith |
| 5,908,874 A | 6/1999 | Fong |
| 5,917,664 A | 6/1999 | O'Neil |
| 5,919,551 A | 7/1999 | Cobb, Jr. |
| 5,932,626 A | 8/1999 | Fong |
| 5,948,514 A | 9/1999 | Komori |
| 5,969,867 A | 10/1999 | Fukushima |
| 6,057,961 A | 5/2000 | Allen |
| 6,107,364 A | 8/2000 | Fong |
| 6,111,696 A | 8/2000 | Allen |
| 6,218,074 B1 | 4/2001 | Dueber |
| 6,261,700 B1 | 7/2001 | Olson |
| 6,280,063 B1 | 8/2001 | Fong |
| 6,291,070 B1 | 9/2001 | Arpac |
| 6,329,058 B1 | 12/2001 | Arney |
| 6,355,754 B1 | 3/2002 | Olson |
| 6,356,391 B1 | 3/2002 | Gardiner |
| 6,359,170 B1 | 3/2002 | Olson |
| 6,368,682 B1 | 4/2002 | Fong |
| 6,376,590 B2 | 4/2002 | Kolb |
| 6,416,910 B1 | 7/2002 | Iimura |
| 6,432,526 B1 | 8/2002 | Arney |
| 6,521,677 B2 | 2/2003 | Yashiro |
| 6,541,591 B2 | 4/2003 | Olson |
| 6,593,392 B2 | 7/2003 | Wang |
| 6,599,631 B2 | 7/2003 | Kambe |
| 6,645,569 B2 | 11/2003 | Cramer |
| 6,656,990 B2 | 12/2003 | Shustack |
| 6,727,309 B1 | 4/2004 | Paiva |
| 6,809,889 B2 | 10/2004 | Tokuda |
| 6,844,950 B2 | 1/2005 | Ja Chisholm |
| 6,846,089 B2 | 1/2005 | Stevenson |
| 6,953,623 B2 | 10/2005 | Olson |
| 7,046,439 B2 | 5/2006 | Kaminsky |
| 7,074,463 B2 | 7/2006 | Jones |
| 7,179,513 B2 | 2/2007 | Jones |
| 7,309,517 B2 | 12/2007 | Jones |
| 7,326,448 B2 | 2/2008 | Jones |
| 7,524,543 B2 | 4/2009 | Jones |
| 7,622,164 B2 | 11/2009 | Jones |
| 7,763,331 B2 | 7/2010 | Jones |
| 2002/0057497 A1 | 5/2002 | Gardiner |
| 2003/0021566 A1 | 1/2003 | Shustack |
| 2003/0100693 A1 | 5/2003 | Olson |
| 2003/0129385 A1 | 7/2003 | Hojo |
| 2003/0165680 A1 | 9/2003 | Brady |
| 2003/0175004 A1 | 9/2003 | Garito |
| 2003/0180029 A1 | 9/2003 | Garito |
| 2004/0021133 A1 | 2/2004 | Nagpal |
| 2004/0131826 A1 | 7/2004 | Chisholm |
| 2004/0132858 A1 | 7/2004 | Chisholm |
| 2004/0229059 A1 | 11/2004 | Kausch |
| 2004/0233526 A1 | 11/2004 | Kaminsky |
| 2005/0049325 A1 | 3/2005 | Chisholm |
| 2005/0059766 A1 | 3/2005 | Jones |
| 2005/0063898 A1 | 3/2005 | Ja Chisholm |
| 2005/0136252 A1 | 6/2005 | Chisholm |
| 2005/0151119 A1 | 7/2005 | Jones |
| 2005/0170158 A1 | 8/2005 | Hattori |
| 2006/0077322 A1 | 4/2006 | Chuang |
| 2006/0210726 A1 | 9/2006 | Jones |
| 2006/0226583 A1 | 10/2006 | Marushin |
| 2007/0082218 A1 | 4/2007 | Chuang |
| 2007/0112097 A1 | 5/2007 | Olson |
| 2008/0030829 A1 | 2/2008 | Jones |
| 2008/0050560 A1 | 2/2008 | Jones |
| 2009/0176061 A1 | 7/2009 | Jones |
| 2010/0178470 A1 | 7/2010 | Jones |
| 2010/0253885 A1 | 10/2010 | Jones |

FOREIGN PATENT DOCUMENTS

| | | |
|---|---|---|
| EP | 1 510 557 | 3/2005 |
| JP | 06-059107 | 3/1994 |
| JP | 08-217991 | 8/1996 |
| JP | 11-223703 | 8/1999 |
| JP | 2000-147208 | 5/2000 |
| JP | 2001-133607 | 5/2001 |
| JP | 2003-512287 | 4/2003 |
| JP | 2003-535375 | 11/2003 |
| JP | 2003-342338 | 12/2003 |
| JP | 2004-145157 | 5/2004 |
| JP | 2005-314661 | 11/2005 |
| JP | 2005-316219 | 11/2005 |
| KR | 2004-0024603 | 3/2004 |
| WO | WO 96/19347 | 6/1996 |
| WO | WO 98/50340 | 11/1998 |
| WO | WO 98/50441 | 11/1998 |
| WO | WO 98/50442 | 11/1998 |
| WO | WO 98/50805 | 11/1998 |
| WO | WO 98/50806 | 11/1998 |
| WO | WO 00/06495 | 2/2000 |
| WO | WO 00/14050 | 3/2000 |
| WO | WO 01/29138 | 4/2001 |
| WO | WO 01/30702 | 5/2001 |
| WO | WO 01/51539 | 7/2001 |
| WO | WO 01/92980 | 12/2001 |
| WO | WO 02/00594 | 1/2002 |
| WO | WO 02/45129 | 6/2002 |
| WO | WO 02/051892 | 7/2002 |
| WO | WO 03/011785 | 2/2003 |
| WO | WO 03/033558 | 4/2003 |
| WO | WO 03/041875 | 5/2003 |
| WO | WO 03/045846 | 6/2003 |
| WO | WO 03/076528 | 9/2003 |
| WO | WO 2004/042434 | 5/2004 |
| WO | WO 2005/103815 | 11/2005 |
| WO | WO 2007/046649 | 4/2007 |

OPTICAL FILM ASSEMBLY AND DISPLAY DEVICE

RELATED APPLICATIONS

This application is a continuation of application Ser. No. 12/818,224, filed Jun. 18, 2010 now U.S. Pat. No. 8,168,271, now allowed, which is a divisional of application Ser. No. 12/481,991 filed Jun. 10, 2009, now issued as U.S. Pat. No. 7,763,331, which is a continuation of application Ser. No. 11/422,900, filed Jun. 8, 2006, issued as U.S. Pat. No. 7,622,164, which is a continuation-in-part of U.S. patent application Ser. No. 10/870,366 filed Jun. 17, 2004 now abandoned; a continuation-in-part of U.S. patent application Ser. No. 10/939,184, filed Sep. 10, 2004, issued as U.S. Pat. No. 7,179,513; a continuation-in-part of U.S. patent application Ser. No. 10/938,006, filed Sep. 10, 2004, issued as U.S. Pat. No. 7,289,202; a continuation-in-part of U.S. patent application Ser. No. 11/078,145 filed Mar. 11, 2005, issued as U.S. Pat. No. 7,282,272; and claims priority to PCT application No. US2005/021351, filed Jun. 16, 2005, published as WO2006/028543.

BACKGROUND

Certain microreplicated optical products, such as described in U.S. Pat. Nos. 5,175,030 and 5,183,597, are commonly referred to as "brightness enhancing films". Brightness enhancing films are utilized in many electronic products to increase the brightness of a backlit flat panel display such as a liquid crystal display (LCD) including those used in electroluminescent panels, laptop computer displays, word processors, desktop monitors, televisions, video cameras, as well as automotive and aviation displays.

Brightness enhancing films desirably exhibit specific optical and physical properties including the index of refraction of a brightness enhancing film that is related to the brightness gain (i.e. "gain") produced. Improved brightness can allow the electronic product to operate more efficiently by using less power to light the display, thereby reducing the power consumption, placing a lower heat load on its components, and extending the lifetime of the product.

Brightness enhancing films have been prepared from high index of refraction monomers that are cured or polymerized, as described for example in U.S. Pat. Nos. 5,908,874; 5,932,626; 6,107,364; 6,280,063; 6,355,754; as well as EP 1 014113 and WO 03/076528.

Although various brightness enhancing films are known, industry would find advantage in optical films such as brightness enhancing films and assemblies including at least one optical film having improved properties, such as higher gain. Such films and assemblies can be utilized in a display device.

SUMMARY

Presently described are optical films (e.g. suitable for directing light) comprised of a light transmissible polymeric material having a microstructured surface such as a repeating pattern of linear prisms.

In one embodiment, the film is a substantially non-polarizing film having a single sheet relative gain of at least 1.78.

In another embodiment, the film is a reflective polarizing film having a single sheet relative gain of at least 2.46. The microstructured surface may comprise a pattern of substantially parallel prisms orthogonal to the pass axis of a reflective polarizing base layer film.

In other embodiments, the invention relates to assemblies comprising a first microstructured optical film proximate a second optical film.

In other embodiments, the invention relates to display devise comprising an embodied optical film or an embodied assembly proximate a light-emitting surface.

In one aspect, the assembly comprises a first microstructured optical film proximate a non-structured reflective polarizing film and gain of the assembly of the first film and polarizing film is at least 2.59. In such an assembly, prisms of the microstructured optical film are preferably orthogonal to the pass axis of the reflective polarizing film.

In another aspect, the assembly comprises a first substantially non-polarizing microstructured optical film proximate a second substantially non-polarizing microstructured optical film wherein the relative gain of the assembly of the first and second films is at least 2.80. The second film is positioned such that the prisms are nonparallel (e.g. 90°+/−20°) to the prisms of the first film. This assembly may further include a third optical film (such as a non-structured reflective polarizer) between or proximate the assembly first or second optical film. This assembly of three films may have a relative gain of at least 3.40.

In another aspect, the assembly comprises a microstructured reflective polarizing film proximate a microstructured substantially non-polarizing optical film and the relative gain of the assembly of first and second film is at least 3.33.

In yet another aspect, an assembly of optical films is described comprising a first optical film having a microstructured surface comprised of a light transmissible polymeric material comprising at least 10 wt-% inorganic nanoparticles proximate a second optical film.

In each of these embodiments, the microstructured surface preferably comprises the reaction product of a polymerizable resin having a refractive index of at least 1.61. Further, the polymerizable resin preferably has a low absorbance. The microstructured surface typically comprises the reaction product of a polymerizable composition comprising at least one ethylenically unsaturated monomer, optionally at least one ethylenically unsaturated oligomer, and at least 10 wt-% inorganic nanoparticles. Zirconia is a preferred inorganic nanoparticle. The inorganic nanoparticles are preferably fully condensed surface modified inorganic nanoparticles.

The optical film may comprise a base layer coupled to the microstructured surface. For embodiments wherein the base layer has a high-index axis and the microstructured surface comprises parallel prisms, the prisms are preferably aligned 90 degrees+/−20 degrees to the high-index axis of the base layer.

DETAILED DESCRIPTION

The present invention relates to microstructured optical films, assemblies of films including at least one microstructured optical film, and (e.g. illuminated) display devices including a single microstructured optical film or assembly.

In general, optical films are light transmissible films. Many optical films are designed to modify the wave vectors and resultant ray paths of light passing through the film. This may be accomplished for example by incorporation of a microstructured surface, a matte surface, a specular surface as well as bulk diffusive properties.

As used herein, the term "film" refers to a generally planar structure typically having a thickness substantially smaller (e.g. at least 10 times) than its width and length. The thickness of an optical film is typically at least 25 microns. Although the thickness can be as great as 3 cm for example, typically the film is less than 2 mm, and more typically less than 800 microns.

A preferred type of optical film includes a microstructured surface such as a plurality of prisms on the film surface such that the films can be used to redirect light through reflection and refraction (e.g. of a diffuse light source). Such films are known as brightness enhancing films and light management films.

A typical brightness enhancing film includes a microstructured surface having a regular repeating pattern of symmetrical tips and grooves. Other examples of groove patterns include patterns in which the tips and grooves are not symmetrical and in which the size, orientation, or distance between the tips and grooves is not uniform.

Figure 1:
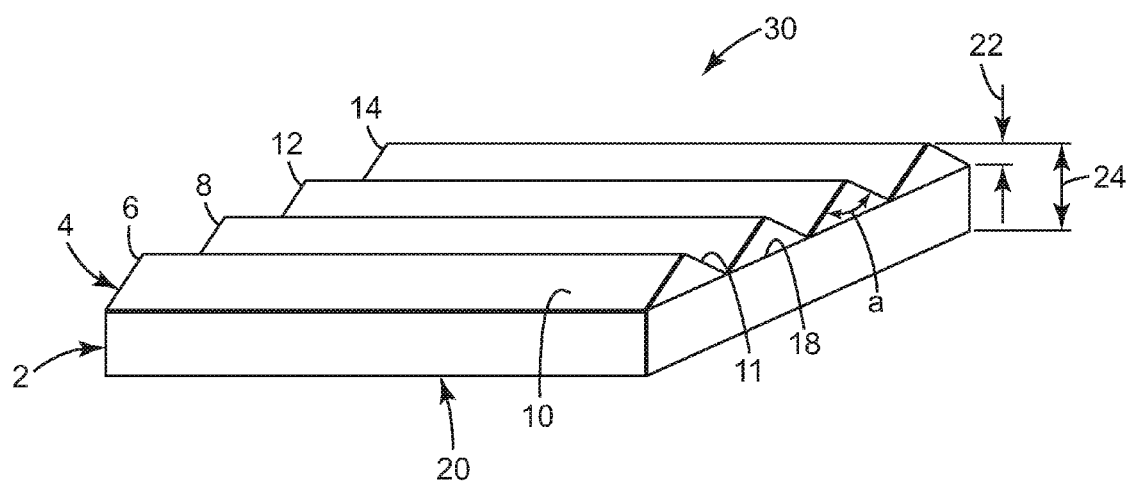
FIG. 1 is a perspective view of an illustrative microstructure-bearing optical product of the present invention.

Referring to FIG. 1, a microstructured optical film 30 may comprise a base layer 2 and a microstructured optical layer 4. Alternatively, the microstructured optical film may be monolithic wherein the base layer and optical layer are comprised of the same material. Monolithic microstructured optical films can be prepared by known methods such as by extrusion of a molten thermoplastic resin. Optical layer 4 comprises a linear array of regular right prisms, identified as prisms 6, 8, 12, and 14. The height of the prisms typically ranges from about 1 to about 75 microns. Each prism, for example, prism 6, has a first facet 10 and a second facet 11. The prisms 6, 8, 12, and 14 are formed on base 2 that has a first surface 18 on which the prisms are formed and a second surface 20 that is substantially flat or planar and opposite first surface 18. By right prisms it is meant that the apex angle α is typically about 90°. However, this angle can range from 70° to 120° and may range from 80° to 100°. Further the apexes can be sharp, rounded, flattened or truncated. The apex angle of rounded prisms can be approximated by the intersection of the (e.g. flat) facets. The prism facets need not be identical, and the prisms may be tilted with respect to each other. The prism heights of the array may be substantially the same or may vary. The relationship between the total thickness 24 of the optical article, and the height 22 of the prisms, may vary. However, it is typically desirable to use relatively thinner optical layers with well-defined prism facets. A typical ratio of prism height 22 to total thickness 24 is generally between 25/125 and 2/125.

Provided that the optical film functions to redirect light, the surface structures may have varying pitch, intersecting channels, and/or varying prism angles. For example, the surface structures may have a pseudo-random prism undulation, such as described in U.S. Pat. No. 6,322,236. The surface structures may have more than three facets, and thus have other shapes such as pyramids. Further, the facets may be rounded facets and/or have other non-triangular shapes. Depending on the shape, the surface structures may be non-prismatic.

Many polymeric materials can be used as a base material and/or microstructured optical layer. Suitable materials are sufficiently optically clear and structurally strong to be assembled into or used within a particular optical product. Preferably, the base material is chosen that has sufficient resistance to temperature and aging that performance of the optical product is not compromised over time.

The particular chemical composition and thickness of the base material and/or microstructured optical layer can depend on the requirements of the particular optical product that is being constructed. That is, balancing the needs for strength, clarity, temperature resistance, surface energy, adherence to the optical layer, among others. The thickness of the base layer is typically at least about 0.025 millimeters (mm) and more typically at least about 0.125 mm. Further, the base layer generally has a thickness of no more than about 1 mm.

Useful base layer and/or microstructured optical layer materials include glass and various polymeric materials including cellulose acetate butyrate, cellulose acetate propionate, cellulose triacetate, polyether sulfone, polymethyl methacrylate, polyurethane, polyester, polycarbonate, polyvinyl chloride, syndiotactic polystyrene, polyethylene naphthalate, norbornene polymers, copolymers or blends based on naphthalene dicarboxylic acids. Optionally, the base material can contain mixtures or combinations of these materials. For example, the base may be multi-layered or may contain a dispersed phase suspended or dispersed in a continuous phase. Exemplary base layer materials include polyethylene terephthalate (PET) and polycarbonate. Examples of useful PET films include photograde polyethylene terephthalate (PET) and PET commercially available from DuPont Films of Wilmington, Del., under the trade designation "Melinex".

Films produced from such base layer materials typically have some birefringence as a result of the film manufacturing process. Although microstructured optical films prepared from such base layers would also have such birefringence, such films are typically not characterized as polarizing films, since such optical films would not be employed as a polarizer in an illuminated (e.g. LCD) display. As used herein, "substantially non-polarizing optical film" refers to optical films whose diffuse reflectance varies by less than 0.05 as a function of polarization. Further, it is also common for a film (e.g. that is stretched during manufacturing) to have a higher index of refraction in one axis (e.g. machine direction) in comparison to a different axis (e.g. cross web direction).

In contrast "reflective polarizing optical film" refers to optical films whose diffuse reflectance varies by at least 0.05 as a function of polarization. Reflective polarizing optical films typically have a substantially higher reflectivity for one polarization mode than for another. Typically, the diffuse reflectance varies by at least 0.1 and more typically by at least 0.2 as a function of polarization.

Microstructured reflective polarizing optical films can be manufactured from a base layer material that is optically active, and can act as a polarizing material. A number of base layer materials are known to be useful as polarizing materials. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120. Multilayer polarizing films are sold by 3M Company, St. Paul, Minn. under the trade designation DBEF (Dual Brightness Enhancement Film). The use of such multilayer polarizing optical film in a brightness enhancement film has been described in U.S. Pat. No. 5,828,488; incorporated herein by reference. Other examples of polarizing films are described in U.S. Pat. Nos. 5,882,774, 5,965,247, 6,025,897. Other polarizing and non-polarizing films can also be useful as the base layer for brightness enhancing films of the invention such as described in U.S. Pat. Nos. 5,612,820 and 5,486,949, among others.

In some embodiments, unstructured polarizing and substantially non-polarizing films may be employed as the base layer of the microstructured optical film. In other embodiments, unstructured polarizing and substantially non-polarizing films are employed in an assembly in combination with at least one microstructured optical film. As used herein "unstructured polarizing films" refers to films that lack a (e.g. prismatic) surface structure. Unstructured polarizing films may have smooth, matte, or rough surface.

Brightness enhancing films generally enhance on-axis luminance (referred herein as "brightness") of a lighting device. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

A common way of measuring the effectiveness of such recycling of light is to measure the gain of an optical film. As used herein, "relative gain", is defined as the on-axis luminance, as measured by the test method described in the examples, when an optical film (or optical film assembly) is placed on top of the light box, relative to the on-axis luminance measured when no optical film is present on top of the light box. This definition can be summarized by the following relationship:

Relative Gain=(Luminance measured with optical film)/(Luminance measured without optical film)

Presently described are optical films and optical film assemblies exhibiting higher relative gain.

In one embodiment, an optical film comprising a light transmissive (e.g. cured) polymeric material having a microstructured surface is described. The optical film is a substantially non-polarizing film having a single sheet relative gain of at least 1.78. The relative single sheet gain is typically no greater than 2.05. Accordingly, the single sheet relative gain may also range from any values in the set of relative gain values including 1.80, 1.82, 1.84, 1.86, 1.88, 1.90, 1.92, 1.94, 1.96, 1.98, 2.00, and 2.02.

In another embodiment, a reflective polarizing optical film having a microstructured surface is described wherein the film comprises a light transmissive (e.g. cured) polymeric material and has a single sheet relative gain of at least 2.46. The relative single sheet gain is typically less than 3.02. Accordingly, the single sheet relative gain may also range from any values in the set of relative gain values including 2.48, 2.50, 2.52, 2.54, 2.56, 2.58, 2.60, 2.62, 2.64, 2.66, 2.68, 2.70, 2.72, 2.74, 2.76, 2.78, 2.80, 2.82, 2.84, 2.86, 2.88, 2.90, 2.92, 2.94, 2.96, 2.98, and 3.00. When a reflective polarizing film is employed as a base layer in a (e.g. prismatic) microstructured optical film, it is preferred that the (e.g. linear) prisms or grooves are aligned in a direction substantially orthogonal to the pass axis of the reflective polarizing film.

In other embodiments, the inventions relate to various assemblies that comprise or consist of two or more films. Each assembly includes a first microstructured optical film proximate a second (e.g. microstructured or unstructured) optical film.

By proximate, it is meant sufficiently near. Proximate can include the first microstructured optical film being in contact with the second optical film such as by the films merely being stacked together or the films may be attached by various means. The films may be attached by mechanical means, chemical means, thermal means, or a combination thereof. Chemical means includes various pressure sensitive, solvent-based, and hot melt adhesives as well as two-part curable adhesive compositions that crosslink upon exposure to heat, moisture, or radiation. Thermal means includes for example a heated embossed roller, radio frequency (RF) welding, and ultrasonic welding. The optical films may be attached (e.g. continuously) across the entire plane of the films, at only select points, or at only the edges. Alternatively, the proximate optical films may be separated from each other with an air interface. The air interface may be created by increasing the thickness of either or both optical films at the periphery, such as by application of an adhesive. When the films are stacked rather than laminated together, the air interface between the optical films may be only a few microns.

In some embodiments, a first microstructured optical film is proximate a second microstructured optical film. In such assemblies, the microstructured surface of the bottom film is preferably disposed proximate the unstructured surface of the top film. For embodiments that employ prismatic microstructured films, the prisms of the films are generally aligned parallel in one principal direction, the prisms being separated by grooves. It is generally preferred to align the prisms (or grooves) of the second (e.g. bottom) microstructured optical film in a stack such that the prisms are substantially orthogonal to the prisms of the first (e.g. top) film. However, other alignments can also be employed. For example, the prisms of the second optical film may be positioned relative to the prisms of the second optical film such that the intersection of grooves or prisms form angles ranging from about 70° to about 120°.

In one embodied assembly, a first microstructured substantially non-polarizing optical film is proximate a second microstructured substantially non-polarizing optical film. The gain of this assembly is at least 2.80. The first optical film may be the same as or different than the second optical film. For example, the second film may have a different base layer composition, a different microstructured surface composition, and/or may have a different surface microstructure. The relative gain of this assembly is typically less than 3.32. Accordingly, the relative gain of such assembly may also range from any values in the set of relative gain values including 2.81, 2.82, 2.84, 2.86, 2.88, 2.90, 2.92, 2.94, 2.96, 2.98, 3.00, 3.02, 3.04, 3.06, 3.08, 3.10, 3.12, 3.14, 3.16, 3.18, 3.20, 3.22, 3.24, 3.26, 3.28, and 3.30.

Reflective polarizing optical films can be combined with other optical films in various assemblies. Such combinations are especially useful for enhancing the output of a diffuse light source with respect to a specific light direction and polarization mode, and are particularly useful for brightness enhancement in liquid crystal devices.

In one embodied assembly, a first (e.g. prismatic) microstructured substantially non-polarizing optical film is proximate a non-structured reflective polarizing film. The gain of this assembly is at least 2.59. The relative gain of this assembly is typically less than 2.86. Accordingly, the relative gain of such assembly may also range from any values in the set of relative gain values including 2.60, 2.62, 2.64, 2.66, 2.68, 2.70, 2.72, 2.74, 2.76, 2.78, 2.80, 2.82, and 2.84. In such an assembly, it is preferred that the prisms or grooves of the prismatic film are aligned substantially orthogonal to the pass axis of the non-structured reflective polarizing film.

In another embodied assembly, a first microstructured substantially non-polarizing optical film is proximate a microstructured reflective polarizing film. The relative gain of this assembly is typically at least 3.33. Further, the relative gain is typically less than 4.20. Accordingly, the relative gain of such assembly may also range from any values in the set of relative gain values including 3.34, 3.36, 3.38, 3.40, 3.42, 3.44, 3.46, 3.48, 3.50, 3.52, 3.54, 3.56, 3.58, 3.60, 3.62, 3.64, 3.66, 3.68, 3.70, 3.72, 3.74, 3.76, 3.78, 3.80, 3.82, 3.84, 3.86, 3.88, 3.90, 3.82, 3.94, 3.96, 3.98, 4.00, 4.02, 4.04, 4.06, 4.08, 4.10, 4.12, 4.14, 4.16, and 4.18.

The various assemblies of microstructured optical films can further be combined with a third optical film. Typically, however, the assembly comprises no greater than two microstructured films with prismatic structures proximate each other. One preferred assembly includes a first and second microstructured substantially non-polarizing optical film proximate each other with a non-structured reflective polarizing optical film. The reflective polarizing film is generally disposed adjacent the assembly of non-reflective polarizing films. During use, the stack is positioned in a display device such that the reflective polarizing film is father from the light source. The relative gain of this three layer stack is typically at least 3.40 and typically no greater than 3.72. Alternatively, however, the non-structured reflective polarizing optical film may be placed between or below the first and second microstructured substantially non-polarizing films.

It is known from electromagnetic theory that refractive index and axial gain are generally directly related. Accordingly, there are various patents directed to higher refractive index material for use in brightness enhancing films. However, the present inventors have discovered that high-index materials alone do not necessarily provide higher gain, particularly in an assembly. Presently described are optical films and assemblies of two or more optical films prepared from polymerizable resins having a synergistic combination of sufficient refractive index and low optical absorption.

The refractive index, as determined with a Fischer Scientific Refractometer Co. Model #6208, of the organic component of the polymerizable composition may be at least 1.48, 1.49, 1.50, 1.51, 1.52, 1.53, 1.54, 1.55, 1.56, 1.57, 1.58, 1.59, 1.60 1.61, or 1.62. The polymerizable composition (e.g. optionally including particles) can have a refractive index as high as 1.70. The refractive index of the polymerizable composition is at least 1.58, 1.59, 1.60, 1.61, 1.62, 1.63, 1.64, 1.65, 1.66, 1.67, 1.68, or 1.69. In general, the refractive indices of the resins may rise upon curing by approximately 0.01 to 0.03. Cured refractive indices can be measured by various techniques as known in the art, such as ellipsometry.

Figure 3:
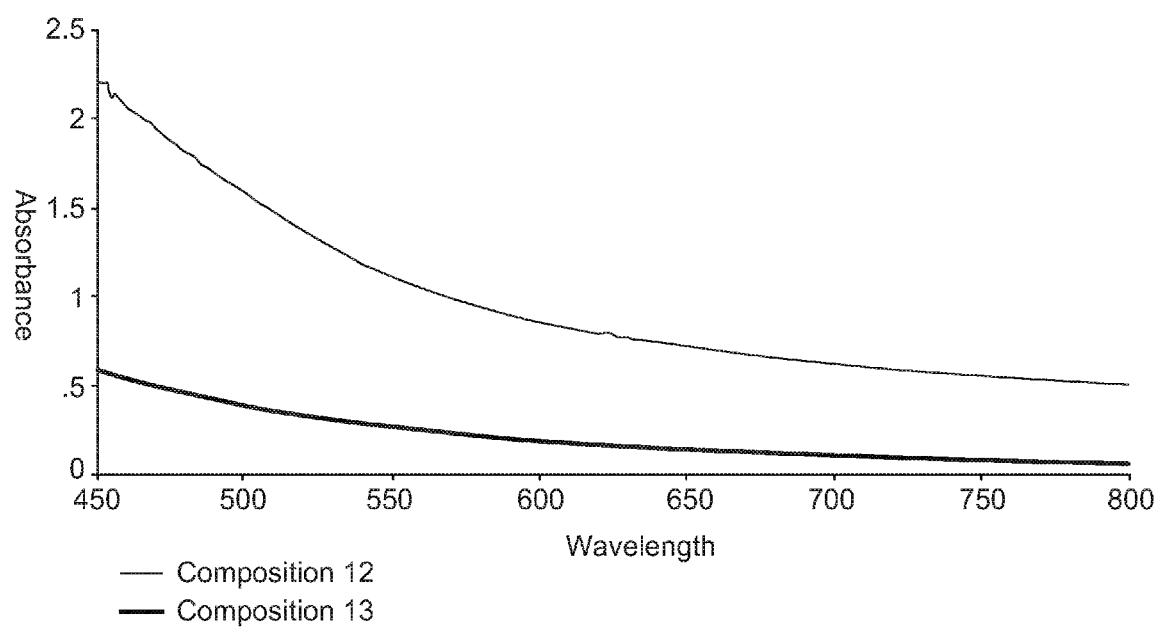
FIG. 3 is an exemplary plot of absorbance as a function of wavelength of two different polymerizable compositions.

FIG. 3 is a plot of absorbance (as measured according to the test method described in the example) as a function of wavelength of representative polymerizable resin compositions (i.e. Polymerizable Resin Compositions 12 and 13 of the examples) employed to produce a substantially non-polarizing microstructured optical film having (i.e. single sheet) relative gain values of 1.793 and 1.829 respectively. Polymerizable Composition 12 is thus representative of a composition suitable for producing a microstructured optical film having a (i.e. single sheet) relative gain value near the preferred minimum value of 1.78.

As can be seen by FIG. 3, the absorbance of these polymerizable resin compositions at wavelengths ranging from about 575 nm to 800 nm is less than 1. The absorbance at 450 nm is less than 2.5 (e.g. less than 2.25). The absorbance at about 500 nm is no greater than 1.75. The absorbance at 550 nm is less than 1.5 (e.g. less than 1.25).

The substantially non-polarizing microstructured optical films produced from representative Polymerizable Resin 12 and 13 were prepared into assemblies each having a stack of two of the same films wherein the prismatic microstructured surface of the bottom film was contacted with the base layer of the top film such that the prisms of the bottom film were orthogonal with the prisms of the top film. The relative gain of the assembly produced from Polymerizable Resin 12 was 2.652; whereas the relative gain of the assembly produced from Polymerizable Resin 13 was 2.807.

Although Polymerizable Resin 12 has sufficiently low absorbance to obtain a single microstructured optical film having a high gain, when combined into an assembly the absorbance contributed by the polymerizable resin is compounded. Thus, in the assemblies of the invention, representative Polymerizable Resin 12 has too high of an absorbance; whereas Polymerizable Resin 13 is a representative composition having an absorbance near the maximum absorbance that is suitable for producing an assembly (i.e. lacking a reflective polarizing film) having the preferred gain value of at least 2.80.

Accordingly, the absorbance of preferred polymerizable resin compositions for use in assemblies is less than 2 at a wavelength of 450 nm. Preferably the absorbance is less than 1.5, more preferably less than 1 and even more preferably less than 0.75 at a wavelength of 450 nm. The absorbance at about 500 nm is preferably less than 1.5, more preferably less than 1.0, and more preferably less than 0.5. At a wavelength of about 550 nm, the absorbance of the polymerizable resin is preferably less than 1 and more preferably less than 0.5. At wavelength between 500 nm and 800 nm, the absorbance of the polymerizable resin is preferably less than 0.5. The absorbance is preferably less than 0.25 at wavelengths ranging from about 600 nm to 800 nm.

The effect of absorbance on relative gain can be compensated to some extent by use of a polymerizable resin composition having a higher refractive index (e.g. 1.64). In such embodiment, the allowable absorbance values may be higher.

Figure 2:
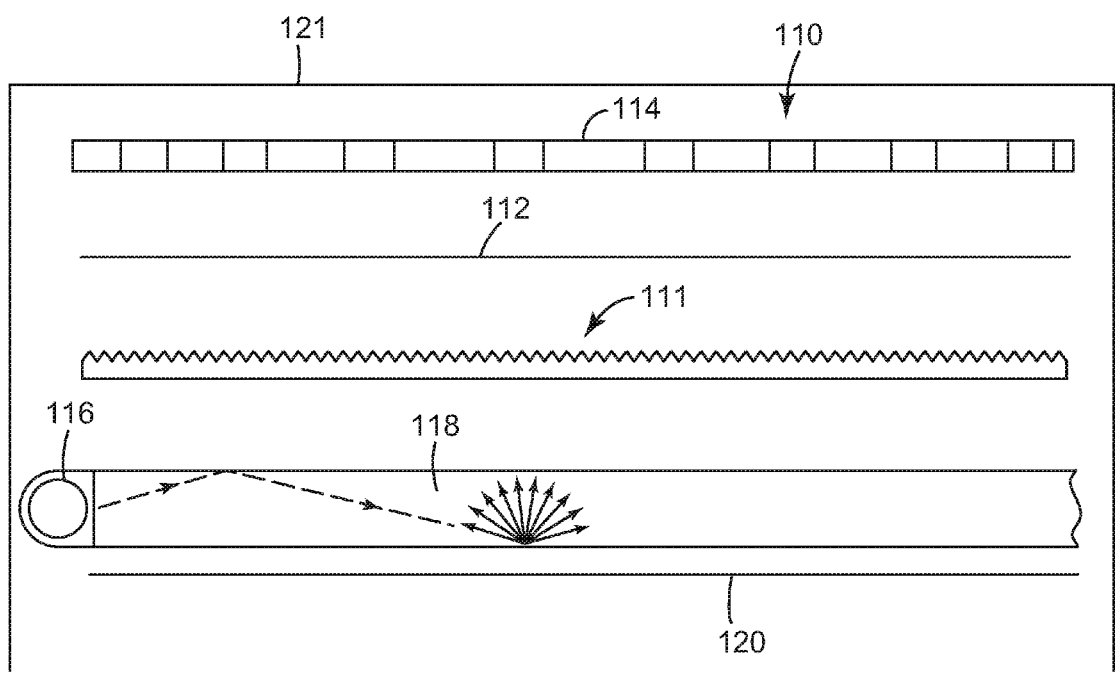
FIG. 2 is a schematic view of an illustrative backlit liquid crystal display including the brightness enhancing film of the invention.

The various microstructured optical films and assemblies described herein can usefully be employed in a variety of displays including for example, direct lit backlights, edge lit backlights, light emitting diode (LED) back lit LCD's, CCFL back lit displays, field-sequential displays, scanning backlights. The microstructured optical film or assembly is typically included to improving the brightness and/or lowering the power consumption. The microstructured optical film(s) or assembly is proximate the other components of the display device. A schematic view of an illustrative backlit liquid crystal display is generally indicated at 110 in FIG. 2. In the actual display, the various components depicted are often in contact with the brightness enhancing film. The brightness enhancing film 111 of the present invention is generally positioned between a light guide 118 and a liquid crystal display panel 114. The liquid crystal display panel typically includes an (e.g. absorbing) polarizer on both surfaces. Thus, such (e.g. absorbing) polarizer is positioned adjacent to the brightness enhancing film of the invention. In the display device the prisms or grooves of the prism sheet closest to the (e.g. absorbing) polarizer are preferably aligned substantially orthogonal to the pass axis of the adjacent absorbing polarizer. Further, when the optical film or assembly includes a reflective polarizer, the pass axis of the reflective polarizer is aligned with the pass axis of the absorbing polarizer of the display device. The backlit liquid crystal display can also include a light source 116 such as a fluorescent lamp and a white reflector 120 also for reflecting light toward the liquid crystal display panel. The brightness enhancing film 111 collimates light emitted from the light guide 118 thereby increasing the brightness of the liquid crystal display panel 114. The increased brightness enables a sharper image to be produced by the liquid crystal display panel and allows the power of the light source 116 to be reduced to produce a selected brightness. The backlit liquid crystal display is useful in equipment such as computer displays (laptop displays and computer monitors), televisions, video recorders, mobile communication devices, handheld devices (i.e. cell phone, personal digital assistant (PDA)), automobile and avionic instrument displays, and the like, represented by reference character 121.

The display may further include another optical film 112 positioned between the brightness enhancing film and the liquid crystal display panel 114. The other optical film may include for example a diffuser, a reflective polarizer, or a second brightness enhancing film. Other optical films may be positioned between optical film 112 and the liquid crystal display panel 114 or between the brightness enhancing film 111 and the light guide 118, as are known in the art. Further, a turning film may be located between lightguide and optical film. Alternatively, the brightness enhancing film may be a turning film. A turning film typically includes prism structures formed on an input surface, and the input surface is disposed adjacent the lightguide. The light rays exiting the lightguide at the glancing angle, usually less than 30 degrees to the output surface, encounter the prism structures. The light rays are refracted by a first surface of the prism structures and are reflected by a second surface of the prism structures such that they are directed by the turning lens or film in the desired direction, e.g., substantially parallel to a viewing axis of the display.

The combination of 111 and 112 alone or in combination with a third optical film may be any of the optical film assemblies described herein. If these additional optical films are included as the base layer of the brightness enhancing films, then the thickness of the base layer may be considerably greater than previously described.

In one preferred aspect, a microstructured non-polarizing film or an assembly including such has been found to improve the on-axis luminance of certain backlights. Off-axis luminance peaks have been found to be common in edge-lit backlight displays including specular back reflectors, and particularly in such displays including a wedge lightguide.

The optical films described herein can comprise a polymerized structure comprising the reaction product of an organic component optionally comprising a plurality of (e.g. surface modified) nanoparticles. The polymerized structure can be an optical element or optical product constructed of a base layer and an optical layer. The base layer and optical layer can be formed from the same or different polymer material.

As described in Lu (U.S. Pat. No. 5,183,597) and Lu et al. (U.S. Pat. No. 5,175,030), a microstructure-bearing article (e.g. brightness enhancing film) can be prepared by a method including the steps of (a) preparing a polymerizable composition (i.e. the polymerizable composition of the invention); (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master. One or more of the surfaces of the base film can be optionally be primed or otherwise be treated to promote adhesion of the optical layer to the base.

Suitable methods of polymerization include solution polymerization, suspension polymerization, emulsion polymerization, and bulk polymerization, as are known in the art. Suitable methods include heating in the presence of a free-radical initiator as well as irradiation with electromagnetic radiation such as ultraviolet or visible light in the presence of a photoinitiator. Inhibitors such as hydroquinone, 4-methoxy phenol, and hindered amine nitroxide inhibitors at levels of 50-1000 ppm are frequently used in the synthesis of the polymerizable composition to prevent premature polymerization of the resin during synthesis, transportation and storage. Other kinds and/or amounts of inhibitors may be employed as known to those skilled in the art. The composition of the invention is preferably polymerizable by irradiation with ultraviolet or visible light in the presence of a photoinitiator.

The polymerizable composition or organic component thereof is preferably a substantially solvent free polymerizable composition. "Substantially solvent free" refer to the polymerizable composition having less than 5 wt-%, 4 wt-%, 3 wt-%, 2 wt-%, 1 wt-%, and 0.5 wt-% of (e.g. organic) solvent. The concentration of solvent can be determined by known methods, such as gas chromatography. Solvent concentrations of less than 0.5 wt-% are preferred.

The organic component can be a solid or comprise a solid component provided that the melting point in the polymerizable composition is less than the coating temperature. The organic component can be a liquid at ambient temperature.

The components are preferably chosen such that the organic component has a low viscosity, such as less than 1000 cps at 180° F. Typically the viscosity of the organic component is substantially lower than the organic component of compositions previously employed. The viscosity of the organic component is less than 1000 cps and typically less than 900 cps. The viscosity of the organic component may be less than 800 cps, less than 450 cps, less than 600 cps, or less than 500 cps at the coating temperature. As used herein, viscosity is measured with 25 mm parallel plates using a Dynamic Stress Rheometer (at a shear rate up to 1000 sec-1). Further, the viscosity of the organic component is typically at least 10 cps, more typically at least 50 cps, even more typically at least 100 cps, and most typically at least 200 cps at the coating temperature. The coating temperature typically ranges from ambient temperature, (i.e. 25° C.) to 180° F. (82° C.). The coating temperature may be less than 170° F. (77° C.), less than 160° F. (71° C.), less than 150° F. (66° C.), less than 140° F. (60° C.), less than 130° F. (54° C.), or less than 120° F. (49° C.).

The polymerizable composition comprises one or more ethylenically unsaturated monomers. The polymerizable composition may comprise a (meth)acrylated urethane oligomer, a (meth)acrylated polyester oligomer, a (meth)acrylated phenolic oligomer, a (meth)acrylated acrylic oligomer, and mixtures thereof. In some embodiments, however, the organic component is free of urethane linkages and thus prepared from the reaction product of a polymerizable composition that is free of (meth)acrylated urethane. Polymerizable compositions comprising (meth)acrylated urethanes tend to be higher in viscosity.

In some embodiments, the polymerizable composition may comprise at least one oligomeric ethylenically unsaturated monomer having a number average molecular weight of greater than 450 g/mole in combination with a reactive diluent and/or crosslinker. In other embodiments, the polymerizable composition may comprise one or more ethylenically unsaturated monomers wherein the organic phase is free of oligomeric monomer having a number average molecular weight of greater than 450 g/mole.

For embodiments wherein surface modified nanoparticles having sufficient polymerizable reactive groups are employed, a crosslinking agent need not be employed. In preferred embodiments the polymerizable composition and thus components thereof comprises solely acrylate functionality and thus is substantially free of methacrylate functional groups.

The polymerizable composition described herein preferably comprises (e.g. surface modified) inorganic oxide particles. The size of such particles is chosen to avoid significant visible light scattering. It may be desirable employ a mixture of inorganic oxide particle types to optimize an optical or material property and to lower total composition cost. Hybrid polymers formed from inorganic nanoparticles and organic resin is amenable to achieving durability unobtainable with conventional organic resins alone. The inclusion of the inorganic nanoparticles can improve the durability of the articles (e.g. brightness enhancing film) thus formed.

Although inorganic nanoparticles lacking polymerizable surface modification can usefully be employed, the inorganic nanoparticles are preferably surface modified such that the nanoparticles are polymerizable with the organic component. Surface modified (e.g. colloidal) nanoparticles can be present in the polymerized structure in an amount effective to enhance the durability and/or refractive index of the article or optical element. The surface modified colloidal nanoparticles described herein can have a variety of desirable attributes, including for example; nanoparticle compatibility with resin systems such that the nanoparticles form stable dispersions within the resin systems, surface modification can provide reactivity of the nanoparticle with the resin system making the composite more durable, properly surface modified nanoparticles added to resin systems provide a low impact on uncured composition viscosity. A combination of surface modifiers can be used to manipulate the uncured and cured properties of the composition. Appropriately surface modified nanoparticles can improve the optical and physical properties of the optical element such as, for example, improve resin mechanical strength, minimize viscosity changes while increasing solid volume loading in the resin system and maintain optical clarity while increasing solid volume loading in the resin system.

The surface modified colloidal nanoparticles can be oxide particles having a primary particle size or associated particle size of greater than 1 nm and less than 100 nm. It is preferred that the nanoparticles are unassociated. Their measurements can be based on transmission electron microscopy (TEM). The nanoparticles can include metal oxides such as, for example, alumina, tin oxides, antimony oxides, silica, zirconia, titania, mixtures thereof, or mixed oxides thereof. Surface modified colloidal nanoparticles can be substantially fully condensed.

Non-silica containing fully condensed nanoparticles typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

Silica nanoparticles can have a particle size from 5 to 75 nm or 10 to 30 nm or 20 nm. Silica nanoparticles can be present in the durable article or optical element in an amount from 10 to 60 wt-%, or 10 to 40 wt-%. Silicas for use in the materials of the invention are commercially available from Nalco Chemical Co., Naperville, Ill. under the trade designation "Nalco Colloidal Silicas" such as products 1040, 1042, 1050, 1060, 2327 and 2329. Suitable fumed silicas include for example, products commercially available from DeGussa AG, (Hanau, Germany) under the trade designation, "Aerosil series OX-50", as well as product numbers-130,-150, and -200. Fumed silicas are also commercially available from Cabot Corp., Tuscola, I, under the trade designations CAB-O-SPERSE 2095", "CAB-O-SPERSE A105", and "CAB-O-SIL M5".

Zirconia nanoparticles can have a particle size from 5 to 50 nm, or 5 to 15 nm, or 10 nm. Zirconia nanoparticles can be present in the durable article or optical element in an amount from 10 to 70 wt-%, or 30 to 60 wt-%. Zirconias for use in composition and articles of the invention are available from Nalco Chemical Co. under the trade designation "Nalco OOSSOO8" and from Buhler AG Uzwil, Switzerland under the trade designation "Buhler zirconia Z-WO sol". Zirconia nanoparticle can also be prepared such as described in U.S. Pat. Nos. 6,376,590 and 7,241,437.

Titania, antimony oxides, alumina, tin oxides, and/or mixed metal oxide nanoparticles can have a particle size or associated particle size from 5 to 50 nm, or 5 to 15 nm, or 10 nm. Titania, antimony oxides, alumina, tin oxides, and/or mixed metal oxide nanoparticles can be present in the durable article or optical element in an amount from 10 to 70 wt-%, or 30 to 60 wt-%. Mixed metal oxide for use in materials of the invention are commercially available from Catalysts & Chemical Industries Corp., Kawasaki, Japan, under the trade designation "Optolake 3".

Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing.

The nanoparticles of the present invention are preferably treated with a surface treatment agent. In general a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such particle size, particle type, modifier molecular wt, and modifier type. In general it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl)methoxyethoxyethoxyethyl carbamate, N-(3-triethoxysilylpropyl) methoxyethoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltri-isopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof. Further, a proprietary silane surface modifier, commercially available from OSI Specialties, Crompton South Charleston, W.V. under the trade designation "Silquest A1230", has been found particularly suitable.

The surface modification of the particles in the colloidal dispersion can be accomplished in a variety of ways. The process involves the mixture of an inorganic dispersion with surface modifying agents. Optionally, a co-solvent can be added at this point, such as for example, 1-methoxy-2-propanol, ethanol, isopropanol, ethylene glycol, N,N-dimethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing. In a preferred method, the mixture can be reacted at about 85° C. for about 24 hours, resulting in the surface modified sol. In a preferred method, where metal oxides are surface modified the surface treatment of the metal oxide can preferably involve the adsorption of acidic molecules to the particle surface. The surface modification of the heavy metal oxide may take place at room temperature.

The surface modification of $ZrO_2$ with silanes can be accomplished under acidic conditions or basic conditions. In one preferred case the silanes are preferably heated under acid conditions for a suitable period of time. At which time the dispersion is combined with aqueous ammonia (or other base). This method allows removal of the acid counter ion from the $ZrO_2$ surface as well as reaction with the silane. In a preferred method the particles are precipitated from the dispersion and separated from the liquid phase.

The surface modified particles can then be incorporated into the curable resin in various methods. In a preferred aspect, a solvent exchange procedure is utilized whereby the resin is added to the surface modified sol, followed by removal of the water and co-solvent (if used) via evaporation, thus leaving the particles dispersed in the polymerizable resin. The evaporation step can be accomplished for example, via distillation, rotary evaporation or oven drying.

In another aspect, the surface modified particles can be extracted into a water immiscible solvent followed by solvent exchange, if so desired.

Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

A combination of surface modifying agents can be useful, wherein at least one of the agents has a functional group co-polymerizable with a hardenable resin. Combinations of surface modifying agent can result in lower viscosity. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

A preferred combination of surface modifying agent includes at least one surface modifying agent having a functional group that is co-polymerizable with the (organic component of the) hardenable resin and a second modifying agent different than the first modifying agent. The second modifying agent is optionally co-polymerizable with the organic component of the polymerizable composition. The second modifying agent may have a low refractive index (i.e. less than 1.52 or less than 1.50). The second modifying agent is preferably a polyalkyleneoxide containing modifying agent that is optionally co-polymerizable with the organic component of the polymerizable composition.

A variety of ethylenically unsaturated monomer may be employed in the organic component of the polymerizable composition.

Suitable oligomeric (meth)acrylated aromatic epoxy oligomers are commercially available from Sartomer under the trade designations "CN104", "CN116", "CN120", CN121" and "CN136"; from Cognis under the trade designation "Photomer 3016"; and from UCB under the trade designations "3200", "3201", "3211" and "3212".

Suitable urethane (meth)acrylates are commercially available from Sartomer under the trade designations "CN965", "CN968", "CN981", "CN983", "CN984", "CN972", and "CN978"; from Cognis under the trade designation "Photomer 6210", "Photomer 6217", "Photomer 6230", "Photomer 6623", "Photomer 6891", and "Photomer 6892"; and from UCB under the trade designations "Ebecryl 1290", "Ebecryl 2001", and "Ebecryl 4842".

Suitable polyester (meth)acrylates are commercially available from Sartomer under the trade designation "CN292"; from Cognis under the trade designation "Photomer 5010", "Photomer 5429", "Photomer 5430", "Photomer 5432", "Photomer 5662", "Photomer 5806", and "Photomer 5920"; and from UCB under the trade designations "Ebecryl 80", "Ebecryl 81", "Ebecryl 83", "Ebecryl 450", "Ebecryl 524", "Ebecryl 525", "Ebecryl 585", "Ebecryl 588", "Ebecryl 810", and "Ebecryl 2047".

Suitable phenolic (meth)acrylates are commercially available from Sartomer under the trade designation "SR601" and "SR602"; from Cognis under the trade designations "Photomer 4025" and "Photomer 4028".

Suitable (meth)acrylated acrylic oligomers are also commercially available or can be prepared by methods known in the art.

The polymerizable composition may comprise a first monomer that comprises a major portion having the following general structures I or II:

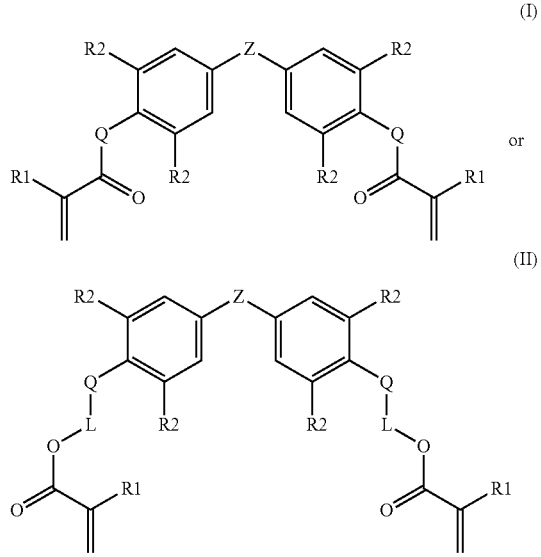

In each of structures I and II, each R1 is independently hydrogen or methyl. Each R2 is independently hydrogen or bromine. Each Z is independently —C(CH$_3$)$_2$—, —CH$_2$—, —C(O)—, —S—, —S(O)—, or —S(O)$_2$—, and each Q is independently O or S. Typically, the R1 groups are the same. Typically, the R2 groups are the same as each other well. In structure II, L is a linking group. L may independently comprise a branched or linear C$_2$-C$_{12}$ alkyl group. The carbon chain of the alkyl group may optionally be substituted with one or more oxygen groups. Further, the carbon atoms of the alkyl group may optionally be substituted with one or more hydroxyl groups. For example L may be —CH$_2$CH(OH)CH$_2$—. Typically, the linking groups are the same. Preferably the alkyl group comprises no more than 8 carbon atoms and more preferably no more than 6 carbon atoms. Mixtures of I and II may also be employed.

The first monomer may be synthesized or purchased. As used herein, major portion refers to at least 60-70 wt-% of the monomer containing the specific structure(s) just described. It is commonly appreciated that other reaction products are also typically present as a byproduct of the synthesis of such monomers.

The first monomer is preferably the reaction product of Tetrabromobisphenol A diglycidyl ether and acrylic acid. The first monomer may be obtained from UCB Corporation, Smyrna, Ga. under the trade designation "RDX-51027". This material comprises a major portion of 2-propenoic acid, (1-methylethylidene)bis[(2,6-dibromo-4,1-phenylene)oxy (2-hydroxy-3,1-propanediyl)]ester.

Although, mixtures of such first monomers may also suitably be employed, for ease in manufacturing it is preferred to employ as few different monomers as possible, yet still attain a brightness enhancing film with suitable gain. To meet this end, it is preferred that the brightness enhancing film is comprised of the reaction product of only one of these first monomers and in particular the reaction product of Tetrabromobisphenol A diglycidyl ether and acrylic acid.

The polymerizable composition may comprise at least one (meth)acrylated aromatic epoxy oligomer. Various (meth)acrylated aromatic epoxy oligomers are commercially available. For example, (meth)acrylated aromatic epoxy, (described as a modified epoxy acrylates), are available from Sartomer, Exton, Pa. under the trade designation "CN118", "CN115" and "CN112C60". (Meth)acrylated aromatic epoxy oligomer, (described as an epoxy acrylate oligomer), is available from Sartomer under the trade designation "CN2204". Further, an (meth)acrylated aromatic epoxy oligomer, (described as an epoxy novolak acrylate blended with 40% trimethylolpropane triacrylate), is available from Sartomer under the trade designation "CN112C60".

In some embodiments, the aromatic epoxy acrylate is derived from bisphenol A, such as those of II. In other embodiments, however, the aromatic epoxy acrylate may be derived from a monomer different than bisphenol A.

The polymerizable composition component may comprise aromatic epoxy acrylate, at least one crosslinking agent, at least one reactive diluent, and at least one other ethylenically unsaturated monomer. Alternatively, the organic component of the polymerizable composition may only include the aromatic epoxy acrylate and crosslinking agent or the aromatic epoxy acrylate and reactive diluent, each of such including photoinitiator. If an aromatic epoxy acrylate is employed the polymerizable composition, the aromatic epoxy acrylate may be monofunctional provided that the polymerizable composition includes at least one ingredient that comprises at least two ethylenically unsaturated polymerizable groups. The aromatic epoxy acrylate may have three or more (meth)acrylate groups. The aromatic epoxy(meth)acrylate may be halogenated, typically having a refractive index of greater than 1.56. In other aspects, the aromatic epoxy(meth)acrylate may have a refractive index of less than 1.56. The aromatic epoxy(meth)acrylate may have a viscosity of greater than 2150 cps at 65° C. Less than 30 wt-% of the aromatic epoxy(meth)acrylate may be employed, for example in combination with a reactive diluent. In other embodiments, the aromatic epoxy(meth)acrylate may have a viscosity of less than 2150 cps at 65° C., and diluent may not be employed. Greater than 30 wt-% of the aromatic epoxy(meth)acrylate may be employed in organic component.

The first monomer and/or aromatic epoxy(meth)acrylate is preferably present in the polymerizable composition in an amount of at least about 15 wt-% (e.g. 20 wt-%, 30 wt-%, 35 wt-%, 40 wt-%, 45 wt-% and 50 wt-% and any amount there between). Typically, the amount of the first monomer and/or aromatic epoxy(meth)acrylate does not exceed about 60 wt-%.

In addition to the first monomer and/or aromatic epoxy (meth)acrylate, the polymerizable composition of the invention can optionally include at least one and preferably only one crosslinking agent. Multi-functional monomers can be used as crosslinking agents to increase the glass transition temperature of the polymer that results from the polymerizing of the polymerizable composition. The glass transition temperature can be measured by methods known in the art, such as Differential Scanning Calorimetry (DSC), modulated DSC, or Dynamic Mechanical Analysis. Preferably, the polymeric composition is sufficiently crosslinked to provide a glass transition temperature that is greater than 45° C.

The crosslinking agent comprises at least two and preferably at least three (meth)acrylate functional groups. Suitable crosslinking agents include for example hexanediol acrylate (HDDA), pentaerythritol tri(meth)acrylate, pentaerythritol tetra(meth)acrylate, trimethylolpropane tri(methacrylate), dipentaerythritol penta(meth)acrylate, dipentaerythritol hexa(meth)acrylate, trimethylolpropane ethoxylate tri(meth)acrylate, glyceryl tri(meth)acrylate, pentaerythritol propoxylate tri(meth)acrylate, and ditrimethylolpropane tetra(meth)acrylate. Any one or combination of crosslinking agents may be employed.

The crosslinking agent may be present in the polymerizable composition in an amount of at least about 2 wt-%. Typically, the amount of crosslinking agent is not greater than about 25 wt-%. The crosslinking agent may be present in any amount ranging from about 5 wt-% and about 15 wt-%.

Preferred crosslinking agents include hexanediol diacrylate (HDDA), pentaerythritol tri(meth)acrylate, pentaerythritol tetra(meth)acrylate, dipentaerythritol penta(meth)acrylate, trimethylolpropane tri(meth)acrylate, ditrimethylolpropane tetra(meth)acrylate, and mixtures thereof. Pentaerythritol triacrylate (PETA) and dipentaerythritol pentaacrylate are commercially available from Sartomer Company, Exton, Pa. under the trade designations "SR444" and "SR399LV" respectively; from Osaka Organic Chemical Industry, Ltd. Osaka, Japan under the trade designation "Viscoat #300"; from Toagosei Co. Ltd., Tokyo, Japan under the trade designation "Aronix M-305"; and from Eternal Chemical Co., Ltd., Kaohsiung, Taiwan under the trade designation "Etermer 235". Trimethylol propane triacrylate (TMPTA) and ditrimethylol propane tetraacrylate (di-TMPTA) are commercially available from Sartomer Company under the trade designations "SR351" and "SR355". TMPTA is also available from Toagosei Co. Ltd. under the trade designation "Aronix M-309". Further, ethoxylated trimethylolpropane triacrylate and ethoxylated pentaerythritol triacrylate are commercially available from Sartomer under the trade designations "SR454" and "SR494" respectively.

In each embodiment described herein, the polymerizable resin composition optionally, yet preferably comprises up to about 35 wt-% (e.g. integers ranging from 1 to 35) reactive diluents to reduce the viscosity of the polymerizable resin composition and to improve the processability. Reactive diluents are mono-ethylenically unsaturated monomers such as (meth)acrylates or monomeric N-substituted or N,N-disubstituted (meth)acrylamides, especially an acrylamide. These include N-alkylacrylamides and N,N-dialkylacrylamides, especially those containing $C_{1-4}$ alkyl groups. Examples are N-isopropylacrylamide, N-t-butylacrylamide, N,N-dimethylacrylamide, N,N-diethylacrylamide, N-vinyl pyrrolidone and N-vinyl caprolactam.

Preferred diluents can have a refractive index greater than 1.50 (e.g. greater than 1.55. Such reactive diluents can be halogenated or non-halogenated (e.g. non-brominated). Suitable monomers typically have a number average molecular weight no greater than 450 g/mole.

Suitable reactive diluents include for example phenoxy ethyl (meth)acrylate; phenoxy-2-methylethyl(meth)acrylate; phenoxyethoxyethyl(meth)acrylate, 3-hydroxy-2-hydroxypropyl(meth)acrylate; benzyl(meth)acrylate, 4-(1-methyl-1-phenethyl)phenoxyethyl(meth)acrylate; phenylthio ethyl acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; 2-phenylphenoxy ethyl acrylate; 4-phenylphenoxy ethyl acrylate; 2,4-dibromo-6-sec-butylphenyl acrylate; 2,4-dibromo-6-isopropylphenyl acrylate; benzyl acrylate; phenyl acrylate; 2,4,6-tribromophenyl acrylate. Other high refractive index monomers such as pentabromobenzyl acrylate and pentabromophenyl acrylate can also be employed.

The inclusion of only one diluent is preferred for ease in manufacturing. A preferred diluent is phenoxyethyl (meth)acrylate, and in particular phenoxyethyl acrylate (PEA). Phenoxyethyl acrylate is commercially available from more than one source including from Sartomer under the trade designation "SR339"; from Eternal Chemical Co. Ltd. under the trade designation "Etermer 210"; and from Toagosei Co. Ltd under the trade designation "TO-1166". Benzyl acrylate is commercially available from AlfaAesar Corp, Ward Hill, Mass.

The optional high index monomer may be halogenated (i.e. brominated). One exemplary high index optional monomer is 2,4,6-tribromophenoxyethyl(meth)acrylate commercially available from Daiichi Kogyo Seiyaku Co. Ltd (Kyoto, Japan) under the trade designation "BR-31".

Such optional monomer(s) may be present in the polymerizable composition in amount of at least about 5 wt-%. The optional monomer(s) typically total no more than about 50 wt-% of the polymerizable composition. In some embodiments the total amount of optional high index monomer ranges from about 30 wt-% to about 45 wt-% (including integers between 30 and 45).

The UV curable polymerizable compositions comprise at least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoyldiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

The polymerizable compositions are energy curable in time scales preferably less than five minutes such as for a brightness enhancing film having a 75 micron thickness. The polymerizable composition is preferably sufficiently crosslinked to provide a glass transition temperature that is typically greater than 45° C. The glass transition temperature can be measured by methods known in the art, such as Differential Scanning Calorimetry (DSC), modulated DSC, or Dynamic Mechanical Analysis. The polymerizable composition can be polymerized by conventional free radical polymerization methods.

The polymerizable compositions described herein may be advantageous for other optical materials such as microstructure-bearing optical articles (e.g. films). Exemplary optical materials include optical articles such as lens films, LED encapsulants, free-standing lenses, unstructured (e.g. flat) films, multilayer films, retroreflective sheeting, optical light fibers or tubes, and flexible molds (e.g. suitable for making barrier ribs for plasma display panels) and others.

DEFINITIONS OF TERMS USED WITHIN THE PRESENT DESCRIPTION

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using an Abbe refractometer in the visible light region (available commercially, for example, from Fisher Instruments of Pittsburgh, Pa.). It is generally appreciated that the measured index of refraction can vary to some extent depending on the instrument.

"(Meth)acrylate" refers to both acrylate and methacrylate compounds.

"Polymerizable composition" refers to the total composition including the organic component that comprises at least one polymerizable monomer and the optional inorganic nanoparticles.

"Organic component" refers to all of the components of the composition except for the inorganic nanoparticles and nanoparticle surface modifier(s). For embodiments wherein the polymerizable composition is free of inorganic nanoparticles, the organic component and polymerizable composition are the same.

The term "nanoparticles" is defined herein to mean particles (primary particles or associated primary particles) with a diameter less than about 100 nm.

"Surface modified colloidal nanoparticle" refers to nanoparticles each with a modified surface such that the nanoparticles provide a stable dispersion.

"Aggregation" refers to a strong association between primary particles that may be chemically bound to one another. The breakdown of aggregates into smaller particles is difficult to achieve.

"Agglomeration refers to a weak association between primary particles which may be held together by charge or polarity and can be broken down into smaller entities.

"Primary particle size" refers to the mean diameter of a single (non-aggregate, non-agglomerate) particle.

The recitation of numerical ranges by endpoint includes all number subsumed within that range (e.g. to the degree of precision for the numerical endpoint). For example a relative gain of greater than 1.78 and less than 2.05 includes 1.79, 1.80, 1.81, 1.82, etc., up to 2.04.

Each of the patents referenced herein are incorporated by reference in their entirety.

Advantages of the invention are further illustrated by the following examples, but the particular materials and amounts thereof recited in the examples, as well as other conditions and details, should not be construed to unduly limit the invention. All percentages and ratios herein are by weight unless otherwise specified.

EXAMPLES

Refractive Index of the polymerizable compositions was determined with a Fischer Scientific Refractometer Co. Model #6208.

Gain Test Method

Optical performance of the films was measured using a SpectraScan∩ PR-650 SpectraColorimeter with an MS-75 lens, available from Photo Research, Inc, Chatsworth, Calif. The films were placed on top of a diffusely transmissive hollow light box. The diffuse transmission and reflection of the light box can be described as Lambertian. The light box was a six-sided hollow cube measuring approximately 12.5 cm×12.5 cm×11.5 cm (L×W×H) made from diffuse PTFE plates of ~6 mm thickness. One face of the box is chosen as the sample surface. The hollow light box had a diffuse reflectance of ~0.83 measured at the sample surface (e.g. ~83%, averaged over the 400-700 nm wavelength range, measurement method described below). During the gain test, the box is illuminated from within through a ~1 cm circular hole in the bottom of the box (opposite the sample surface, with the light directed towards the sample surface from the inside). This illumination is provided using a stabilized broadband incandescent light source attached to a fiber-optic bundle used to direct the light (Fostec DCR-II with ~1 cm diameter fiber bundle extension from Schott-Fostec LLC, Marlborough Mass. and Auburn, N.Y.). A standard linear absorbing polarizer (such as Melles Griot 03 FPG 007) is placed between the sample box and the camera. The camera is focused on the sample surface of the light box at a distance of ~34 cm and the absorbing polarizer is placed ~2.5 cm from the camera lens. The luminance of the illuminated light box, measured with the polarizer in place and no sample films, was >150 cd/m$^2$. The sample luminance is measured with the PR-650 at normal incidence to the plane of the box sample surface when the sample films are placed parallel to the box sample surface, the sample films being in general contact with the box. The relative gain is calculated by comparing this sample luminance to the luminance measured in the same manner from the light box alone. The entire measurement was carried out in a black enclosure to eliminate stray light sources. When the relative gain of film assemblies containing reflective polarizers was tested, the pass axis of the reflective polarizer was aligned with the pass axis of the absorbing polarizer of the test system. Relative gain values reported for prismatic films were generally obtained with the prism grooves of the film nearest the absorbing polarizer being aligned perpendicular to the pass axis of the absorbing polarizer.

The diffuse reflectance of the light box was measured using a 15.25 cm (6 inch) diameter Spectralon-coated integrating sphere, a stabilized broadband halogen light source, and a power supply for the light source all supplied by Labsphere (Sutton, N.H.). The integrating sphere had three opening ports, one port for the input light (of 2.5 cm diameter), one at 90 degrees along a second axis as the detector port (of 2.5 cm diameter), and the third at 90 degrees along a third axis (i.e. orthogonal to the first two axes) as the sample port (of 5 cm diameter). A PR-650 Spectracolorimeter (same as above) was focused on the detector port at a distance of ~38 cm. The reflective efficiency of the integrating sphere was calculated using a calibrated reflectance standard from Labsphere having ~99% diffuse reflectance (SRT-99-050). The standard was calibrated by Labsphere and traceable to a NIST standard (SRS-99-020-REFL-51). The reflective efficiency of the integrating sphere was calculated as follows:

Sphere brightness ratio=1/(1−Rsphere*Rstandard)

The sphere brightness ratio in this case is the ratio of the luminance measured at the detector port with the reference sample covering the sample port divided by the luminance measured at the detector port with no sample covering the sample port. Knowing this brightness ratio and the reflectance of the calibrated standard (Rstandard), the reflective efficiency of the integrating sphere, Rsphere, can be calculated. This value is then used again in a similar equation to measure a sample's reflectance, in this case the PTFE light box:

Sphere brightness ratio=1/(1−Rsphere*Rsample)

Here the sphere brightness ratio is measured as the ratio of the luminance at the detector with the sample at the sample port divided by the luminance measured without the sample. Since Rsphere is known from above, Rsample can be calculated. These reflectances were calculated at 4 nm wavelength intervals and reported as averages over the 400-700 nm wavelength range.

$ZrO_2$ Sols $ZrO_2$ sols were prepared in accordance with the procedures described in Published U.S. Patent Application No. US2006/0204745 that claims priority to U.S. patent application Ser. No. 11/078,468 filed Mar. 11, 2005. The resulting $ZrO_2$ sols were evaluated with Photo Correlation Spectroscopy (PCS), X-Ray Diffraction and Thermal Gravimetric Analysis as described in Published U.S. Patent Application No. US2006/0204745 and U.S. patent application Ser. No. 11/078,468. The $ZrO_2$ sols used in the examples had properties in the ranges that follow:

| | PCS Data | | |
|---|---|---|---|
| Dispersion Index | Intensity avg size (nm) | Volume- avg size (nm) | (Intensity- avg)/(Volume- avg) |
| 1.0-2.4 | 23.0-37.0 | 8.0-18.8 | 1.84-2.97 |

| Relative Intensities | | Apparent Crystallite Size (nm) | | | | | Weighted |
|---|---|---|---|---|---|---|---|
| Cubic/ Tetragonal | Monoclinic | (C, T) (1 1 1) | M (−1 1 1) | M (1 1 1) | Avg M Size | % C/T | Avg XRD Size |
| 100 | 6-12 | 7.0-8.5 | 3.0-6.0 | 4.0-11.0 | 4.5-8.3 | 89%-94% | 7.0-8.4 |

Polymerizable Resin Composition 1

The $ZrO_2$ sol (100.0 g), methoxypropanol (100.0 g), BCEA obtained from Cytec Surface Specialties, Smyrna, Ga. (2.50 g), 2-[2-(2-methoxyethoxy)ethoxy]acetic acid ("MEEAA") obtained from Sigma-Aldrich, Milwaukee, Wis. (5.23 g), a 50/50 wt % blend of phenylthio ethyl acrylate ("PTEA" obtained from Bimax) and BR-31 (20.78 g), and a 5% solution of "Prostab 5198" obtained from Ciba Geigy (0.1 g) were charged to a 500 mL round bottom flask. Water and alcohol were removed via rotary evaporation such that he uncured refractive index of the resultant formulation was 1.6855 and it contained 57.5% $ZrO_2$.

Polymerizable Resin Composition 2

10.03 g of Polymerizable Composition 1 and 0.04 g of Lucirin TPO-L were added to a 25 mL amber vial. The vial was heated and mixed on a roller until the sample was homogeneous. The mixed sample gave an uncured refractive index of 1.6835.

Polymerizable Resin Composition 3

10.05 g of Polymerizable Resin Composition 1 and 2.39 g of a 50/50 wt. % mixture of PTEA/BR-31 were added to a 25 mL amber vial. Next, 0.07 g of Lucirin TPO-L was added to the same vial. The vial was then heated and mixed on a roller until the sample was homogeneous. The mixed sample gave an uncured refractive index of 1.6425.

Polymerizable Resin Composition 4

10.07 g of Polymerizable Resin Composition 1 and 6.32 g of a 50/50 wt. % mixture of PTEA/BR-31 were added to a 25 mL amber vial. Next, 0.11 g of Lucirin TPO-L was added to the same vial. The vial was then heated and mixed on a roller until the sample was homogeneous. The mixed sample gave an uncured refractive index of 1.617.

Polymerizable Resin Composition 5

The $ZrO_2$ sol (100.00 parts by weight), MEEAA (4.44 pbw), BCEA (2.13 pbw), 1-methoxy-2-propanol (115 pbw), a 50/50 mix of SR-339/BR31 (29.78 pbw) and a 5 weight percent solution of Prostab 5198 in water (0.12 g) were charged to a round bottom flask. The alcohol and water were removed via vacuum distillation such that the resulting resin had approximately 53.3 weight percent zirconia and had an uncured refractive index of 1.6525. Lucirin TPO-L was added to the mixture to provide a composition that contained 0.47 parts per hundred by weight of Lucirin TPO-L.

Polymerizable Resin Composition 6

10.06 g of Polymerizable Resin Composition 5 and 2.72 g of a 50/50 wt. % mixture of phenoxyethyl acrylate available from Sartomer Co., under the trade designation SR 339/BR-31 were added to a 25 mL amber vial. Next, 0.02 g of Lucirin TPO-L was added to the same vial. The vial was then heated and mixed on a roller until the sample was homogeneous. The mixed sample gave an uncured refractive index of 1.617.

Polymerizable Resin Composition 7

10.18 g of Polymerizable Resin Composition 5 and 6.8 g of a 50/50 wt. % mixture of SR 339/BR-31 were added to a 25 mL amber vial. Next, 0.02 g of Lucirin TPO-L was added to the same vial. The vial was then heated and mixed on a roller until the sample was homogeneous. The mixed sample gave an uncured refractive index of 1.597.

Polymerizable Resin Composition 8 (Control)

Ex. 1 of Table 1 of U.S. Pat. No. 6,355,754. (RDX51027/EB 220/BR31/PEA/FC430 at a weight ratio of 30/20/37.5/12.5/0.3 and 1 (pph) Darocur 1173). The resin had an uncured refractive index of 1.562.

Polymerizable Resin Composition 9

50.5 g of Polymerizable Resin Composition 5 and 3.15 g of a 50/50 wt. % mixture of SR 339/BR-31 were added to a 25 mL amber vial. The vial was then heated and mixed on a roller until the sample was homogeneous. The mixed sample gave an uncured refractive index of 1.640.

Polymerizable Resin Composition 10

50.25 g of Polymerizable Resin Composition 5 and 6.12 g of a 50/50 wt. % mixture of SR 339/BR-31 were added to a 25 mL amber vial. The vial was then heated and mixed on a roller until the sample was homogeneous. The mixed sample gave an uncured refractive index of 1.633.

Polymerizable Resin Composition 11

50.42 g of Polymerizable Resin Composition 5 and 9.27 g of a 50/50 wt. % mixture of SR 339/BR-31 were added to a 25 mL amber vial. The vial was then heated and mixed on a roller until the sample was homogeneous. The mixed sample gave an uncured refractive index of 1.623.

Each of the resin compositions were prepared into various microstructured optical films and optical film assemblies. Tables 1-9 as follows report the relative gain values of the various films and assemblies.

Film Preparation A—Substantially Non-Polarizing Prismatic Microstructured Optical Film An 8"×11" metal master consisting of linear rows of 90 degree prisms with a nominal pitch spacing of 50 microns, similar to the prism geometry pattern found on Vikuiti BEF II (commercially available from 3M Co., St. Paul, Minn.), was placed on a hot plate and heated to 140° F. A 4 ml bead of the polymerizable resin (as set forth in the Tables) was applied to the master tool using a disposable pipette. Next, a 500 gauge PET available from Dupont Teijin Films as MELINEX 623 was placed on the bead of resin and master tool. The PET film was oriented so the linear prisms are oriented approximately perpendicular (90°+/−20°) to the high gain axis of the film. The master tool, resin and PET were then passed through a heated nip roll at 160° F. with sufficient force for the resin to fill the master tool completely, while eliminating any entrained air. The filled master tool was then exposed to ultraviolet radiation from a "D-bulb" using a P150 power supply available from Fusion UV Systems, Inc. Gaithersburg, Md. at a linespeed of 50 fpm for two passes. The PET film was then manually removed from the master tool. The prismatic coating formed on the PET film resulted in a coating thickness of approximately 25 microns.

Film Preparation B—Reflective Polarizing Prismatic Microstructured Optical Film

The optical film was prepared in the same manner described in Film Preparation A except the PET film was replaced with a reflective polarizer film as described in Example 3 of U.S. Patent Application Ser. No. 60/668,873 filed Apr. 6, 2005) utilizing the Sahara SA 115 protective boundary layers; incorporated by reference.

Film Preparation C

The optical film was prepared in the same manner described in Film Preparation B except that the master tool had a prism pattern that consisted of linear rows of 90 degree prisms with a nominal pitch spacing of 50 microns, where the linear prisms have a designed pseudo-random undulation in their peak height, similar to the prism geometry pattern found on Vikuiti BEF III (commercially available from 3M Co., St. Paul, Minn.).

TABLE 1

Single Sheet Relative Gain of Microstructured Non-Polarizing Optical Film (Film Preparation A)

| Microstructured Optical Film Example | Polymerizable Resin Composition | Single Sheet Relative Gain |
| --- | --- | --- |
| Ex. 1 | Ex. 2 | 1.969 |
| Ex. 2 | Ex. 3 | 1.932 |

TABLE 1-continued

Single Sheet Relative Gain of Microstructured Non-Polarizing Optical Film (Film Preparation A)

| Microstructured Optical Film Example | Polymerizable Resin Composition | Single Sheet Relative Gain |
| --- | --- | --- |
| Ex. 3 | Ex. 4 | 1.873 |
| Ex. 4 | Ex. 6 | 1.876 |
| Ex. 5 | Ex. 7 | 1.831 |
| Ex. 6 | Ex. 5 | 1.925 |
| Ex. 7 - Control | Ex. 8 | 1.748 |

For Table 2 as follows, an assembly was prepared wherein each of the prismatic microstructured optical films of Table 1 were stacked with an unstructured reflective polarizing film such that the pass axis of the reflective polarizing film was orthogonal to the prisms. The reflective polarizing film employed was the same as the base layer substrate described in Film Preparation B.

TABLE 2

Relative Gain of Assembly of Microstructured Non-Polarizing Optical Film and an Unstructured Reflective Polarizing Film

| Microstructured Optical Film Example | Polymerizable Resin Composition | Assembly Relative Gain |
| --- | --- | --- |
| Ex. 8 | Ex. 2 | 2.751 |
| Ex. 9 | Ex. 3 | 2.724 |
| Ex. 10 | Ex. 4 | 2.654 |
| Ex. 11 | Ex. 6 | 2.663 |
| Ex. 12 | Ex. 7 | 2.616 |
| Ex. 13 | Ex. 5 | 2.707 |
| Ex. 14 - Control | Ex. 8 | 2.544 |

For Table 3 as follows, an assembly was prepared wherein each of the prismatic microstructured optical films of Table 1 were stacked with a second piece of the same film. The prismatic microstructured surface of the bottom film was contacted with the base layer substrate of the top film such that the prisms of the bottom film were orthogonal with the prisms of the top film.

TABLE 3

Relative Gain of Assembly Comprising a Pair of the Same Microstructured Non-Polarizing Optical Film

| Assembly Example | Polymerizable Resin Composition | Single Sheet Example | Assembly Relative Gain |
| --- | --- | --- | --- |
| Ex. 15 | Ex. 2 | Ex. 1 | 3.191 |
| Ex. 16 | Ex. 3 | Ex. 2 | 3.138 |
| Ex. 17 | Ex. 4 | Ex. 3 | 2.947 |
| Ex. 18 | Ex. 6 | Ex. 4 | 3.035 |
| Ex. 19 | Ex. 7 | Ex. 5 | 2.937 |
| Ex. 20 | Ex. 5 | Ex. 6 | 3.120 |
| Ex. 21 - Control | Ex. 8 | Ex. 7 | 2.762 |

For Table 4 as follows, an unstructured reflective polarizing film was stacked above the assembly of Table 3 such that the pass axis of the reflective polarizing film was orthogonal to the prisms of the top sheet. The reflective polarizing film employed was the same as the base layer substrate described in Film Preparation B.

TABLE 4

Relative Gain of Assembly Comprising a Pair of the Same Microstructured Non-Polarizing Optical Films and a Unstructured Reflective Polarizing Optical Film

| Assembly Example | Polymerizable Resin Composition | Single Sheet Example | Assembly Relative Gain |
|---|---|---|---|
| Ex. 22 | Ex. 2 | Ex. 1 | 3.576 |
| Ex. 23 | Ex. 3 | Ex. 2 | 3.618 |
| Ex. 24 | Ex. 4 | Ex. 3 | 3.475 |
| Ex. 25 | Ex. 6 | Ex. 4 | 3.549 |
| Ex. 26 | Ex. 7 | Ex. 5 | 3.481 |
| Ex. 27 | Ex. 5 | Ex. 6 | 3.580 |
| Ex. 28 - Control | Ex. 8 | Ex. 7 | 3.330 |

TABLE 5

Single Sheet Relative Gain of Microstructured Reflective Polarizing Optical Film (Ex. 29 and Ex. 30 Film Preparation B)

| Microstructured Optical Film Example | Polymerizable Resin Composition | Single Sheet Relative Gain |
|---|---|---|
| Ex. 29 | Ex. 5 | 2.492 |
| Ex. 30 | Ex. 2 | 2.904 |
| Ex. 31 - BEF-RP 90/24 (commercially available from 3M Company) | | 2.415 |

For Table 6 as follows, an assembly was prepared wherein each of the prismatic microstructured optical films of Table 1 were stacked with a prismatic microstructured film of Table 5. The prismatic microstructured surface of the bottom film was contacted with the base layer substrate of the top film such that the prisms of the bottom film were orthogonal with the prisms of the top film.

TABLE 6

Relative Gain of Assembly Comprising a Microstructured Non-Polarizing Optical Film and a Microstructured Reflective Polarizing Optical Film

| Assembly Example | Bottom Film Example | Top Film Example | Relative Gain |
|---|---|---|---|
| Ex. 32 | Ex. 1 | Ex. 29 | 3.350 |
| Ex. 33 | Ex. 2 | Ex. 29 | 3.373 |
| Ex. 34 | Ex. 3 | Ex. 29 | 3.322 |
| Ex. 35 | Ex. 4 | Ex. 29 | 3.373 |
| Ex. 36 | Ex. 5 | Ex. 29 | 3.359 |
| Ex. 37 | Ex. 6 | Ex. 29 | 3.369 |
| Ex. 38 | Ex. 7 | Ex. 29 | 3.307 |
| Ex. 39 | Ex. 1 | Ex. 30 | 4.023 |
| Ex. 40 | Ex. 2 | Ex. 30 | 4.027 |
| Ex. 41 | Ex. 3 | Ex. 30 | 3.945 |
| Ex. 42 | Ex. 4 | Ex. 30 | 4.006 |
| Ex. 43 | Ex. 5 | Ex. 30 | 3.990 |
| Ex. 44 | Ex. 6 | Ex. 30 | 4.039 |
| Ex. 45 | Ex. 7 | Ex. 30 | 3.900 |
| Ex. 46 | Ex. 6 | Ex. 31 | 3.399 |
| Ex. 47 Control | Ex. 7 | Ex. 31 | 3.258 |

TABLE 7

Single Sheet Relative Gain of Microstructured Non-Polarizing Optical Film (Film Preparation C)

| Film Example | Polymerizable Resin Example | Single Sheet Relative Gain |
|---|---|---|
| Ex. 48 | Ex. 5 | 1.918 |
| Ex. 49 | Ex. 9 | 1.892 |
| Ex. 50 | Ex. 10 | 1.875 |
| Ex. 51 | Ex. 11 | 1.860 |
| Ex. 52 Control | Ex. 8 | 1.741 |

For Table 8 as follows, an assembly was prepared wherein each of the prismatic microstructured optical films of Table 7 were stacked with a second piece of the same film. The prismatic microstructured surface of the bottom film was contacted with the base layer substrate of the top film such that the prisms of the bottom film were orthogonal with the prisms of the top film.

TABLE 8

Relative Gain of Assembly Comprising a Pair of the Same Microstructured Non-Polarizing Optical Films

| Assembly Example | Polymerizable Resin Example | Assembly Relative Gain |
|---|---|---|
| Ex. 53 | Ex. 5 | 2.927 |
| Ex. 54 | Ex. 9 | 2.906 |
| Ex. 55 | Ex. 10 | 2.867 |
| Ex. 56 | Ex. 11 | 2.833 |
| Ex. 57 Control | Ex. 8 | 2.636 |

For Table 9 as follows, an assembly was prepared wherein the prismatic microstructured surface of the indicated bottom film was contacted with the base layer substrate of the indicated top film such that the prisms of the bottom film were orthogonal with the prisms of the top film.

TABLE 9

Relative Gain of Assembly Comprising a Pair of Different Microstructured Non-Polarizing Optical Films

| Assembly Example | Bottom Film Example | Top Film Example | Relative Gain |
|---|---|---|---|
| Ex. 58 | Ex. 6 | Ex. 48 | 3.006 |
| Ex. 59 | Ex. 48 | Ex. 6 | 2.977 |
| Ex. 60 | Ex. 4 | Ex. 6 | 3.060 |

Table 9 illustrates that when a substantially non-polarizing microstructured optical film is combined with a second substantially non-polarizing microstructured optical film having a different (i.e. single sheet) relative gain, it is preferred to position the microstructured optical film having the higher single sheet gain (e.g. lower absorption) at the top of a film stack assembly.

Polymerizable Resin Composition 12

The $ZrO_2$ sol was dialyzed for approximately 4.5 hr (Spectra/Por Membrane MWCO 12-14,000 available from VWR) to yield a stable sol at 36.395% $ZrO_2$. The dialyzed $ZrO_2$ sol (220.0 g), MEEAA (5.71 g), BCEA (4.10 g), 1-methoxy-2-propanol (300 g), 2-(1-naphthyloxy)-1-ethyl acrylate NOEA (29.98 g), TMPTA (12.85 g), BR31 (64.25 g) and a 5% solution of Prostab 5198 in water (0.86 g) were charged to a round bottom flask and the alcohol and water were removed via rotary evaporation. The $ZrO_2$ containing resin was 39.86% $ZrO_2$ and had a refractive index of 1.64. 0.6 wt-% of TPO-L was added to the $ZrO_2$ containing resin and mixed together.

Polymerizable Resin Composition 13

Polymerizable Resin Composition 5 was diluted with a 50/50 mix of BR-31/SR339 until the refractive index of the mixture was 1.64.

A Hewlett Packard 8453 Spectrophotometer was used with UV VIS Chem Station Rev. A. 02. 05 analysis software to measure the absorption of Polymerizable Resins Compositions 12 and 13. The liquid polymerizable resin was tested in a quartz cuvette with a 1 cm path length. The resin was tested at 100% solids, there was no dilution of the resin in solvent. A sample blank was run using the empty quartz cuvette. The results are shown in FIG. 3.

Polymerizable Resins Compositions 12 and 13 were prepared into microstructured optical films in accordance with Film Preparation A.

|  | Polymerizable Resin Composition | Relative Gain |
| --- | --- | --- |
| Ex. 61 | 12 | 1.793 |
| Ex. 62 | 13 | 1.829 |

An assembly was prepared wherein each of the prismatic microstructured optical films of Examples 61 and 62 were stacked with a second piece of the same film. The prismatic microstructured surface of the bottom film was contacted with the base layer substrate of the top film such that the prisms of the bottom film were orthogonal with the prisms of the top film.

|  | Polymerizable Resin Composition | Relative Gain |
| --- | --- | --- |
| Ex. 63 | 12 | 2.652 |
| Ex. 64 | 13 | 2.807 |

Display Device Example 65

The assembly of Example 20 (i.e. a crossed sheet pair of substantially non-polarizing microstructured optical films prepared from a polymerizable resin having a refractive index of 1.6525) was compared to a crossed sheet pair of commercially available brightness enhancing films commercially available from 3M Company, St. Paul, Minn. under the trade designation "Vikuiti BEF-II 90/50" in a LCD display.

The LCD module includes a CCFL light source, a wedge-shaped light-guide with a dot extraction pattern, a multi-layer polymeric specular back-reflector behind the light-guide (sold by 3M Company, St. Paul, Minn. under the trade designation ESR [Enhanced Specular Reflector]), a diffusing film in front of the light guide, the assembly of crossed sheet brightness enhancement films in front of the diffusing film, a diffusing cover sheet in front of the BEF II sheets, and lastly a twisted nematic liquid crystal panel having absorbing polarizers on its outer surfaces. Except for the ESR and brightness enhancing films, all the display components were original to a 15.4" LCD module, Hitachi model 4074C, as provided in a commercially available Dell Latitude D800 notebook computer system. The sheets of brightness enhancing optical films are oriented such that prisms on each of the two sheets are orthogonal to each other, and are parallel/perpendicular to the CCFL light source.

Figure 4:
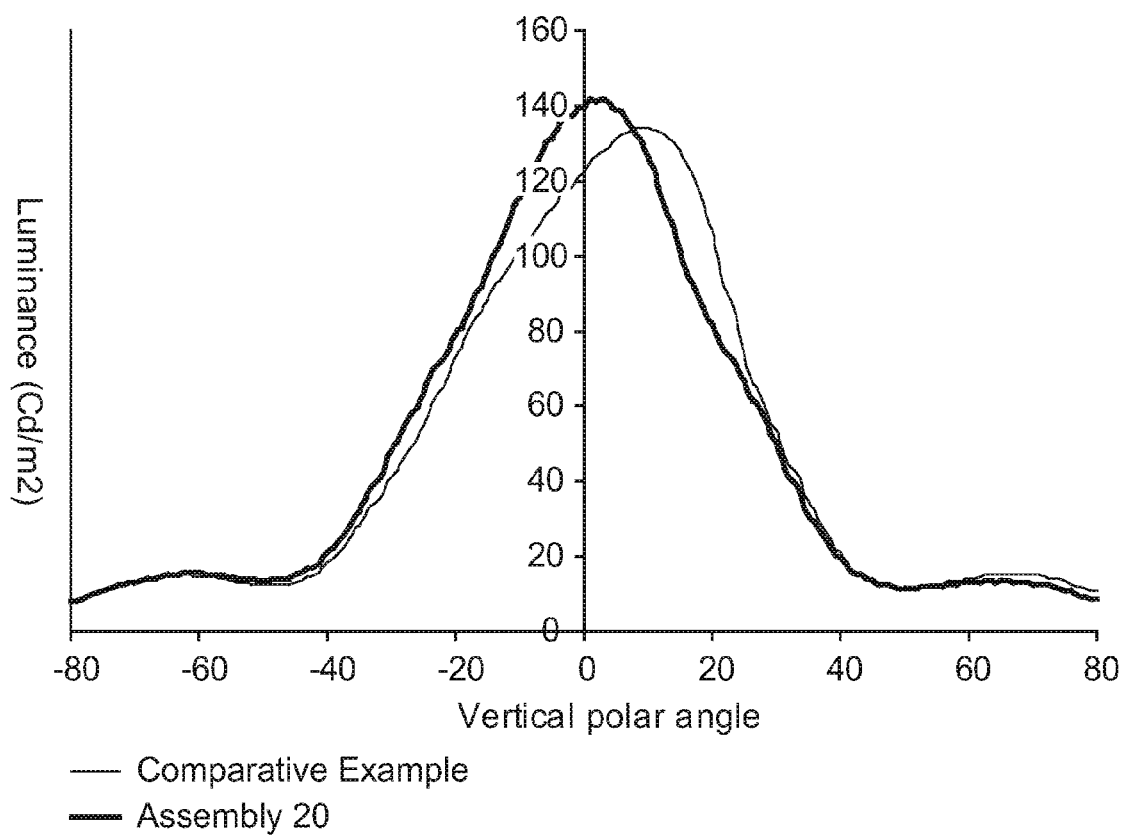
FIG. 4 is an exemplary conoscopic plot of luminance emitted from a liquid crystal display.

The light transmitted from the LCD module was characterized with an Autronic conoscope made by Autronic-Melchers GmbH, Karlsruhe, Germany. The Conoscopic Measurement Device provides a plot of luminance versus viewing angle in both the vertical and horizontal planes. FIG. 4 includes a plot of luminance vs. vertical angle for the assembly of Example 20 in comparison to an assembly of the commercially available films. This plot demonstrates the improved light-refractive power of the films and assemblies of the invention. One effect of this greater refractive power is to direct the luminance peak on-axis. The peak luminance of the display including the assembly of Example 20 exhibits a vertical angle substantially closer to zero. Brightness is maximized in the display by placing the prism grooves of the microstructured film nearest the rear absorbing polarizer of the LCD such that the prism grooves are aligned substantially orthogonal to the pass axis of that absorbing polarizer. This advantage stems from geometric optical principles and the preferred prism orientation applies to both standard prismatic films and the inventive films.

This display device was also tested using a diffuse white back-reflector in place of the specular back-reflector together with the inventive films. In addition, the inventive films were tested both with and without a commercially available reflective polarizer in the device (Vikuiti DBEF-P2, available from 3M), these combinations also were tested with both types of back-reflectors. In all cases, measurable brightness increases were found when using the inventive films compared to standard films such as commercially available Vikuiti BEF-II."

The invention claimed is:

1. An optical film comprised of a light transmissible polymeric material having a microstructured surface wherein at least the microstructured surface comprises the reaction product of a polymerizable resin, the polymerizable resin comprising zirconia nanoparticles and having a refractive index of at least 1.61; wherein the optical film is a substantially non-polarizing film having a single sheet relative gain of at least 1.78; or the optical film is a reflective polarizing film having a single sheet relative gain of at least 2.46.

2. The optical film of claim 1 wherein the microstructured surface comprises a repeating pattern of linear prisms.

3. The optical film of claim 2 wherein the prisms have apexes that are sharp, rounded, or truncated.

4. The optical film of claim 2 wherein the prisms have apex angles that range from 80 degrees to 100 degrees.

5. The optical film of claim 2 wherein the prisms have an apex angle of about 90 degrees, a mean distance between adjacent apices of about 50 micrometers, and the prisms have heights that are substantially the same or vary.

6. The optical film of claim 1 wherein the polymerizable composition has an absorbance of less than 2.5 for a wavelength of 450 nm and an absorbance of less than 1 for wavelengths ranging from about 575 nm to 800 nm.

7. The optical film of claim 1 wherein zirconia nanoparticle as fully condensed surface modified nanoparticles.

8. The optical film of claim 1 wherein the zirconia nanoparticle have a particle size from 5 to 50 nm.

9. The optical film of claim 1 wherein the zirconia nanoparticle have a particle size from 5 to 15 nm.

10. The optical film of claim 1 wherein the optical film comprises a base layer coupled to the microstructured surface.

11. The optical film of claim 10, where the base layer has a high-index axis and the microstructured surface comprises parallel prisms aligned 90 degrees+/−20 degrees to the high-index axis of the base layer.

12. The optical film of claim 10 wherein the base layer comprises styrene-acrylonitrile polymer, cellulose triacetate, polymethyl methacrylate, polyester, polycarbonate, polyethylene naphthalate, copolymers of naphthalene dicarboxylic acids, norbornene polymer, or mixtures thereof.

13. An assembly comprising the microstructured optical film of claim 1 proximate a second optical film.

14. The assembly of claim 13 wherein the second optical film is a turning film, a polarizing film, a diffuser film, or combination thereof.

15. The assembly of claim 13 wherein the assembly comprises the first substantially non-polarizing microstructured optical film having a single sheet relative gain of at least 1.78 proximate a non-structured reflective polarizing film and the assembly has a relative gain of at least 2.59.

16. The assembly of claim 15 wherein the first microstructured optical film comprises a pattern of substantially parallel prisms, the reflective polarizing film has a pass axis, and the prisms of the microstructured optical film are orthogonal to the pass axis of the reflective polarizing film.

17. The assembly of claim 13 wherein the assembly comprises the first substantially non-polarizing microstructured optical film having a single sheet relative gain of at least 1.78 proximate a second substantially non-polarizing microstructured optical film and the assembly has a relative gain of at least 2.80.

18. A device comprising:
  (a) a lighting device having a light-emitting surface; and
  (b) the optical film of claim 1 disposed proximate the light-emitting surface.

19. The device according to claim 18, wherein the lighting device is a backlit liquid crystal display device.

20. The device according to claim 18, wherein the device is a handheld device, a computer display or a television.

* * * * *